United States Patent
Aoki et al.

(10) Patent No.: US 7,358,473 B2
(45) Date of Patent: Apr. 15, 2008

(54) OBJECT DETECTING SYSTEM

(75) Inventors: Hiroshi Aoki, Tokyo (JP); Masato Yokoo, Tokyo (JP); Yuu Hakomori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/705,061

(22) Filed: Feb. 12, 2007

(65) Prior Publication Data

US 2007/0187573 A1 Aug. 16, 2007

(30) Foreign Application Priority Data

Feb. 14, 2006 (JP) .............. 2006-036746

(51) Int. Cl.
G01S 17/08 (2006.01)
G01J 1/32 (2006.01)
G01D 5/34 (2006.01)
B60R 21/015 (2006.01)

(52) U.S. Cl. .......... 250/205; 250/208.1; 250/221; 701/45

(58) Field of Classification Search .......... 250/221, 250/222.1, 208.1, 205; 382/104; 701/36, 701/45, 49; 348/140, 148
See application file for complete search history.

(56) References Cited

U.S. PATENT DOCUMENTS 6,252,240 B1* 6/2001 Gillis et al. .......... 250/559.38
6,441,363 B1* 8/2002 Cook et al. .......... 250/221
6,781,676 B2* 8/2004 Wallace et al. .......... 356/4.03
6,968,073 B1 11/2005 O'Boyle et al.
2004/0040772 A1* 3/2004 Ertl et al. .......... 180/271
2004/0085448 A1 5/2004 Goto et al.
2004/0153229 A1 8/2004 Gokturk et al.
2005/0265014 A1 12/2005 Matsui et al.
2006/0138759 A1* 6/2006 Aoki et al. .......... 280/735
2006/0186651 A1* 8/2006 Aoki .......... 280/735

FOREIGN PATENT DOCUMENTS

EP 1 039 314 A2 9/2000
JP 2003-294855 10/2003
WO WO 01/96147 A3 12/2001

\* cited by examiner

*Primary Examiner*—John R. Lee
(74) *Attorney, Agent, or Firm*—Foley & Lardner LLP

(57) ABSTRACT

An object detecting system, which is installed in a vehicle, uses a camera comprising an optical lens, a distance measuring image chip, and an illumination device to detect information about an object occupying a vehicle seat. The light emitting mode of a first illuminant and a second illuminant of the illumination device is controlled in such a manner that the quantity of incident light onto the distance measuring image chip is equalized to respective portions in the focusing area.

15 Claims, 9 Drawing Sheets

[Fig. 2]
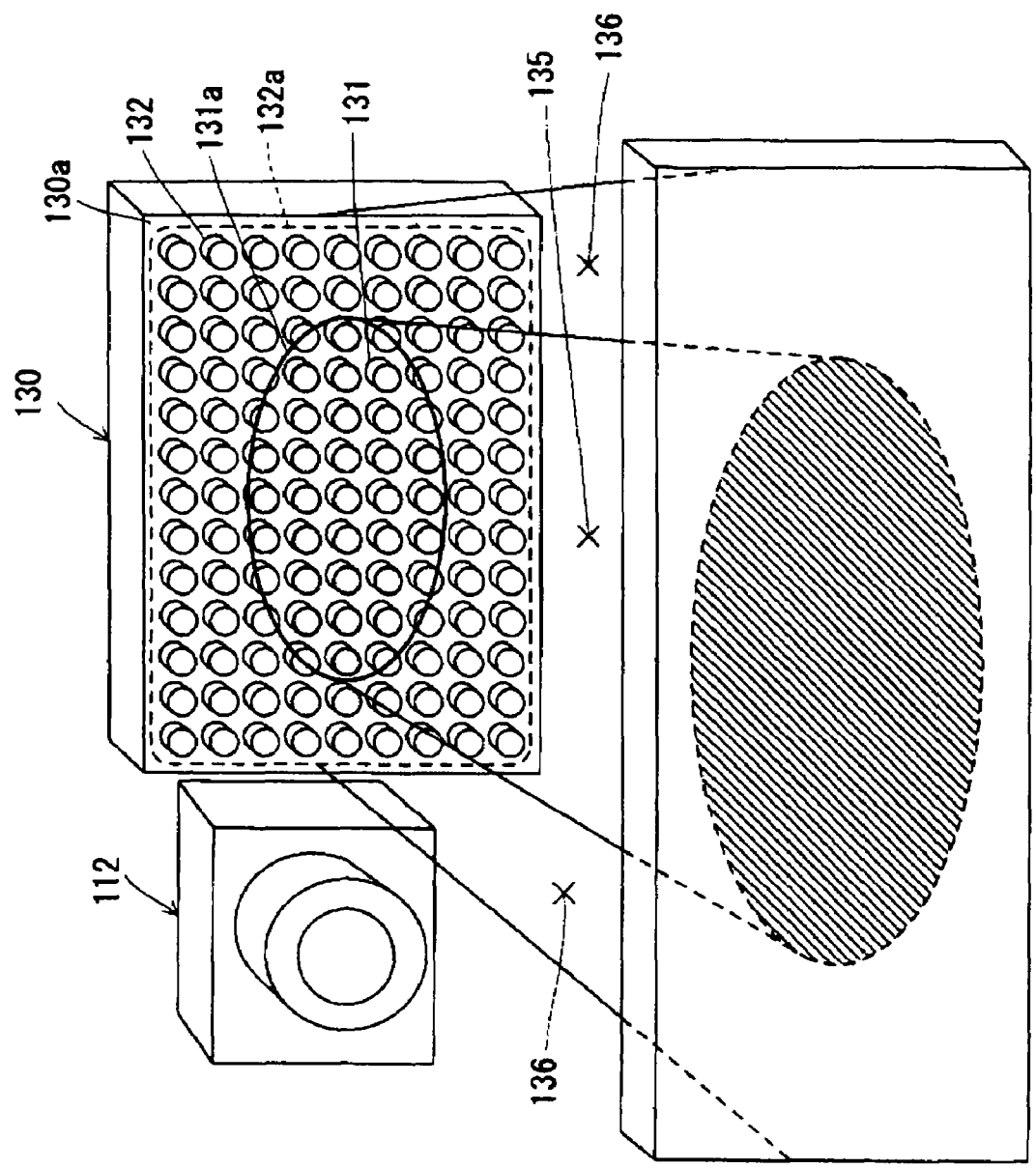

[Fig. 3]
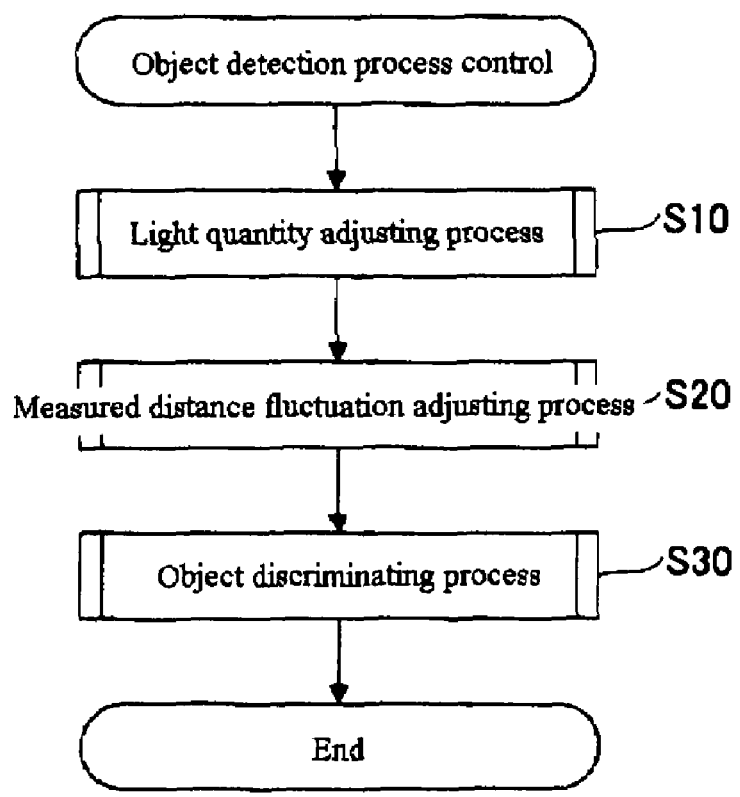

[Fig. 4]
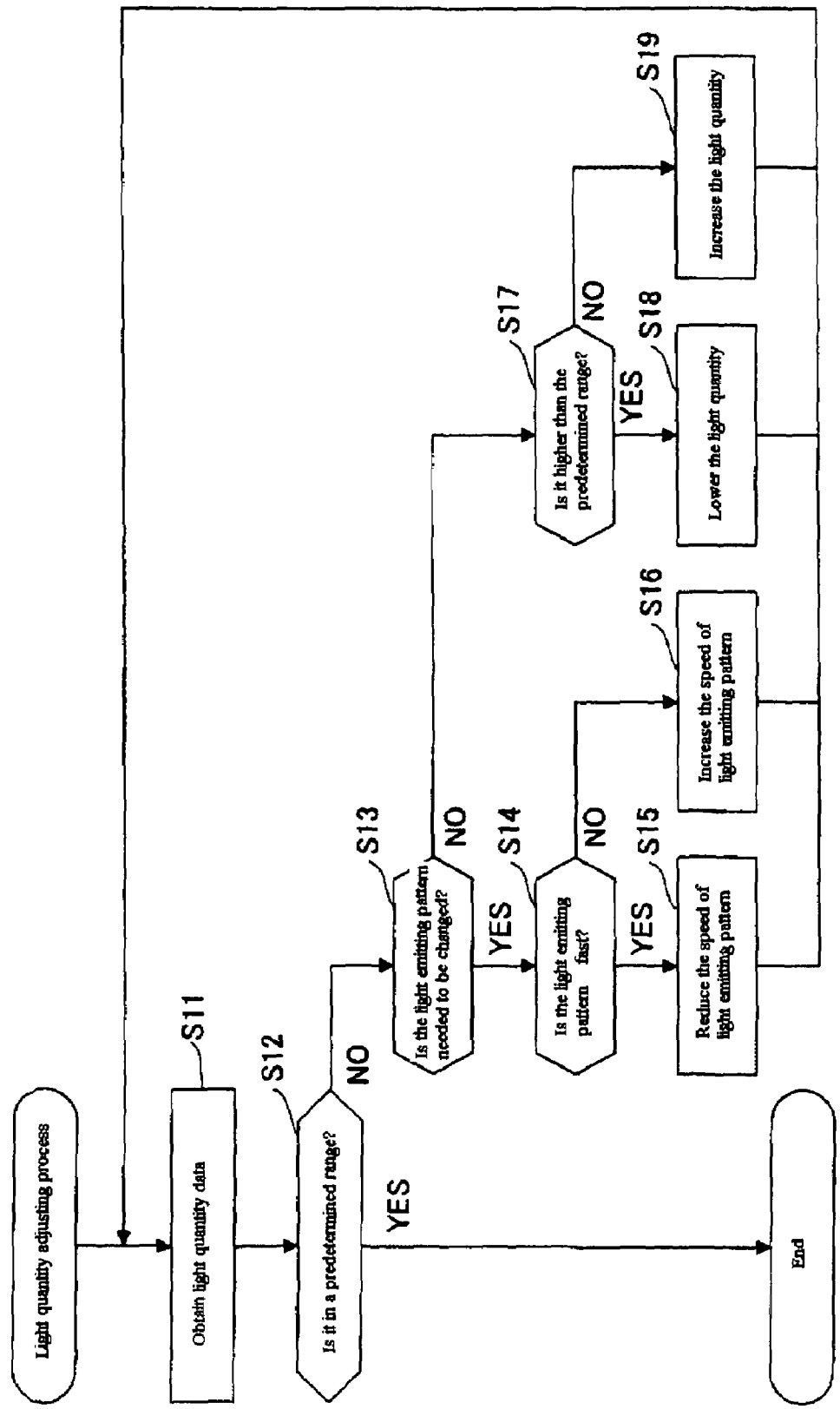

[Fig. 5]
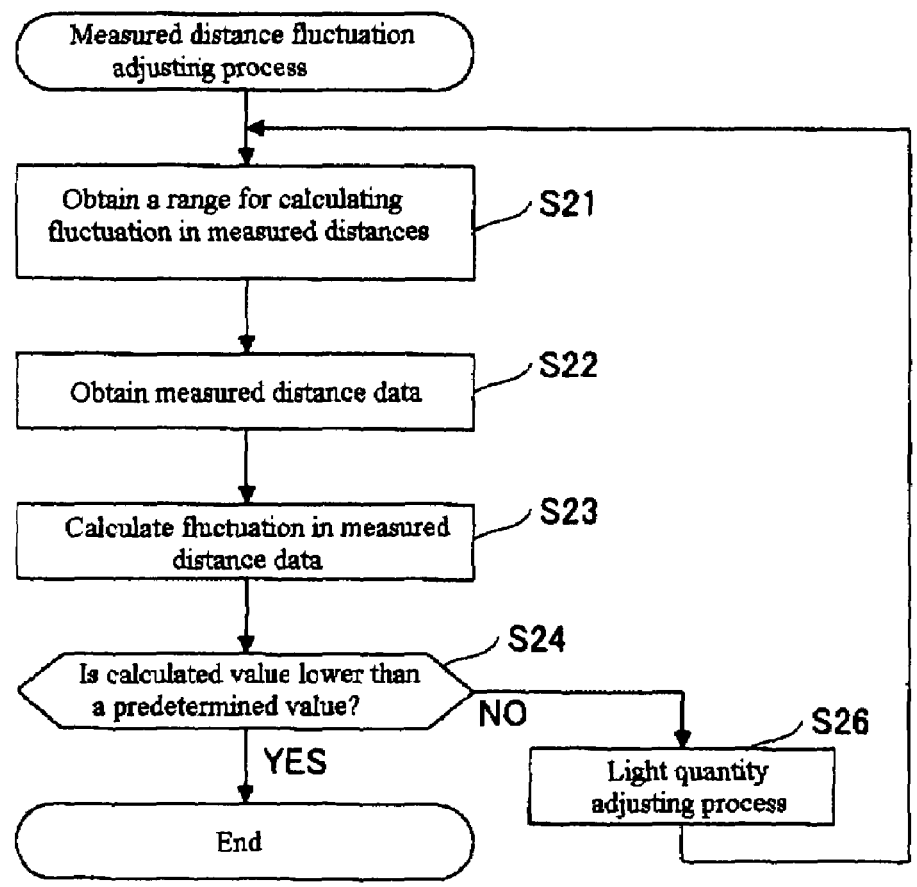

[Fig. 6]
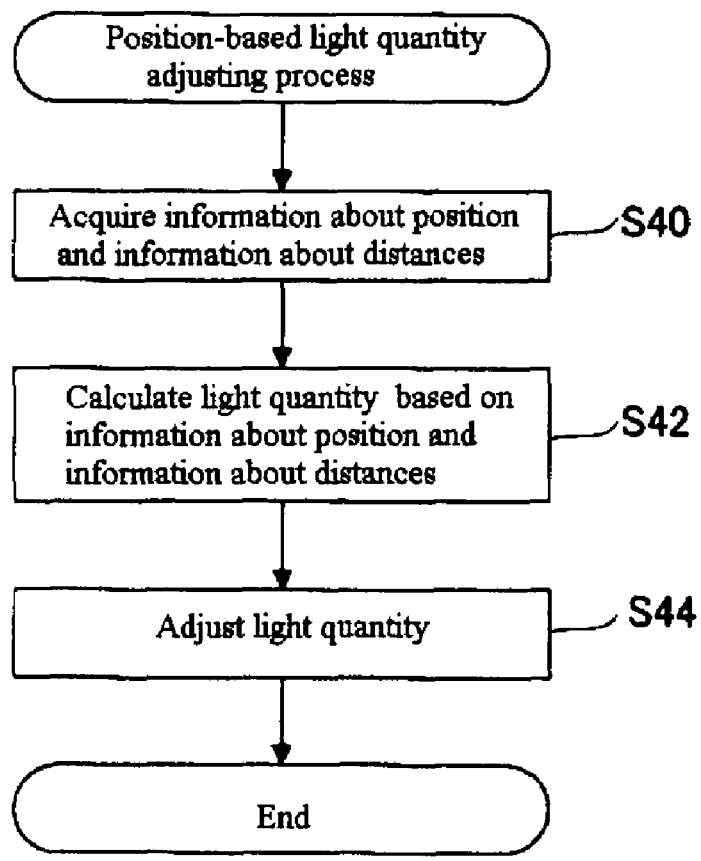

[Fig. 7]
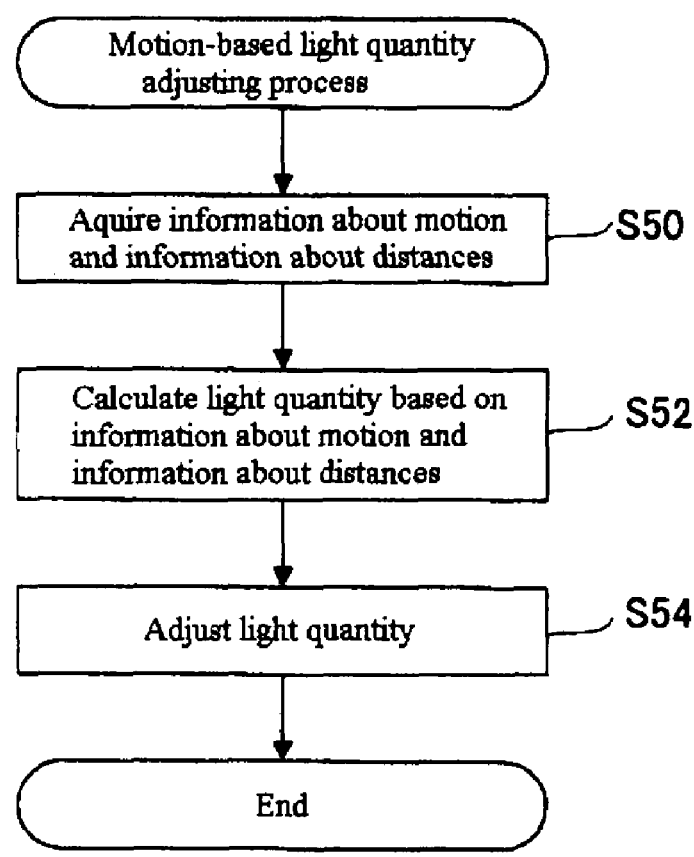

OBJECT DETECTING SYSTEM

BACKGROUND

The present invention relates to an object detecting system to be installed in a vehicle and, more particularly, to a technology for detecting information about an object occupying a vehicle seat.

Conventionally, there are known various technologies for detecting information about an object occupying a vehicle seat by using a photographing mechanism such as a camera. For example, Japanese Patent Unexamined Publication No. 2003-294855 (which is incorporated by reference herein in its entirety) discloses a configuration of an occupant detecting apparatus in which a single camera arranged in front of a vehicle occupant is used to detect the position of the vehicle occupant.

SUMMARY

An exemplary embodiment relates to an object detecting system. The system comprises a light emitting mechanism to emit light toward an object occupying a vehicle seat, a control mechanism to control the light emitting mechanism, a photographing mechanism including an optical lens and a distance measuring image chip, wherein light emitted from the light emitting mechanism and reflected by the object is incident on the distance measuring image chip through the optical lens and is focused into a focusing area of the distance measuring image chip, and a processing mechanism to derive information about the object from the focused image on the distance measuring image chip of the photographing mechanism. The control mechanism changes the light emitting mode of the light emitting mechanism based on information about the quantity of incident light derived by the processing mechanism such that the quantity of incident light on the distance measuring image chip is equalized to respective portions of the focusing area.

Another exemplary embodiment relates to an operation device control system. The system comprises a light emitting mechanism to emit light toward an object occupying a vehicle seat, a control mechanism to control the light emitting mechanism, a photographing mechanism including an optical lens and a distance measuring image chip, wherein light emitted from the light emitting mechanism and reflected by the object is incident on the distance measuring image chip through the optical lens and is focused into a focusing area of the distance measuring image chip, and a processing mechanism to derive information about the object from the focused image on the distance measuring image chip of the photographing mechanism. The system further comprises an operation device which is operated based on the information about the object occupying the vehicle seat derived by the processing mechanism and an actuation control mechanism to control the actuation of the operation device. The control mechanism changes the light emitting mode of the light emitting mechanism based on information about the quantity of incident light derived by the processing mechanism such that the quantity of incident light on the distance measuring image chip is equalized to respective portions of the focusing area.

Yet another exemplary embodiment relates to a vehicle. The vehicle comprises an engine/running system, an electrical system, an actuation control device to control actuation of the engine/running system and the electrical system, and an object detecting mechanism to detect information about an object occupying a vehicle seat. The object detecting mechanism comprises an object detecting system that includes: a light emitting mechanism to emit light toward an object occupying a vehicle seat; a control mechanism to control the light emitting mechanism; a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and a processing mechanism to derive information about the object from the focused image on the distance measuring image chip of the photographing mechanism. The control mechanism changes the light emitting mode of the light emitting mechanism based on information about the quantity of incident light derived by the processing mechanism such that the quantity of incident light on the distance measuring image chip is equalized to respective portions of the focusing area.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1(*b*) is an illustration showing an interior space of a vehicle and an exemplary location of the object detecting system in the vehicle.

FIG. 2 is an illustration showing detailed structures of a first illuminant and a second illuminant shown in FIG. 1.

FIG. 3 is a flow chart of an object detection process control in this embodiment.

FIG. 4 is a flow chart of a light quantity adjusting process in this embodiment.

FIG. 5 is a flow chart of a measured distance fluctuation adjusting process in this embodiment.

FIG. 6 is a flow chart of a position-based light quantity adjusting process of this embodiment.

FIG. 7 is a flow chart of a motion-based light quantity adjusting process of this embodiment.

DETAILED DESCRIPTION

Figure 1A:
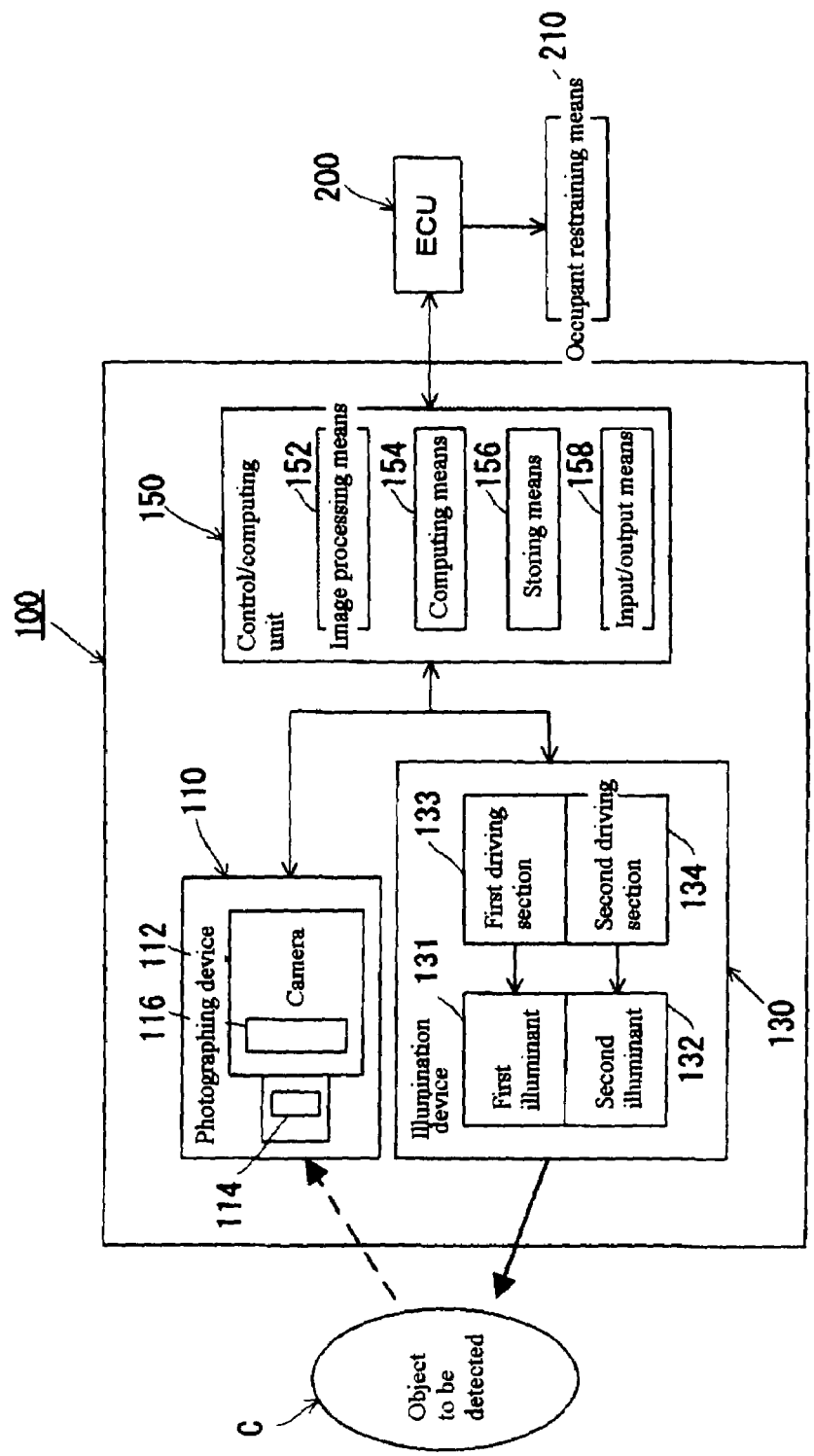
FIG. 1(*a*) is an illustration showing an object detecting system according to an embodiment which is installed in a vehicle.

In a case of using a camera to detect information about a vehicle occupant just like the occupant detecting apparatus disclosed in the aforementioned Japanese Patent Unexamined Publication No. 2003-294855, the quantity of light focused into a focusing area of an image chip through an optical lens is decreased at the peripheral area. This phenomenon becomes significant as the viewing angle of the camera is increased. In addition, the distortion of an image focused in the focusing area of the image chip is increased at the peripheral area as compared to the central area, thus reducing the accuracy of detection of the vehicle occupant. Particularly in the case of using a 3-D camera to detect information about distances relative to a vehicle occupant for the purpose of obtaining detailed information such as the position, posture, physical size, and motion of the vehicle occupant, there must be deterioration and variation in precision of detected distances relative to the vehicle occupant so that it is difficult to obtain desired information precisely. Accordingly, in designing the detecting system, an effective technology for detecting desired information of the object precisely is demanded.

Exemplary embodiments are made in view of the above and it is an object of an embodiment to provide an effective technology for precisely detecting desired information of an object occupying a vehicle seat.

Though embodiments can be adapted to an object detecting system for detecting information about an object occupying a vehicle seat in an automobile, embodiments can also be adapted to a technology for an object detecting system in a vehicle other than an automobile, such as an airplane, boat, train, bus, and the like.

An object detecting system of a first embodiment is a system which detects information about an object occupying a vehicle seat and which comprises a light emitting mechanism, a control mechanism, a photographing mechanism, and a processing mechanism. The object used here can include a vehicle occupant, an object placed on a vehicle seat, a child seat, a junior seat, or any other suitable object on a vehicle seat. In addition, information about the object can include information about the presence, size, position, distances, posture, motion of the object, and light emitting quantity (light distribution amount) and brightness relative to the object. When the object is a vehicle occupant, the information about the object can include the presence of a vehicle occupant, the size (physique class) of the vehicle occupant, position of the occupant, distances relative to the occupant, positions and configurations of body parts of the occupant, posture of the occupant, motion of the occupant, light emitting quantity (light distribution amount) relative to the occupant, and brightness relative to the occupant.

The light emitting mechanism is a mechanism for emitting light toward the object occupying the vehicle seat. Light emitting mechanisms are typically composed of various lamps. The light emitting mechanism is an illuminant for irradiating light to the object occupying the vehicle seat. The actuation of the light emitting mechanism can be controlled by a control mechanism.

The photographing mechanism comprises an optical lens and a distance measuring image chip. Light emitted from the light emitting mechanism and reflected by the object occupying the vehicle seat is incident on the distance measuring image chip through the optical lens and is focused into the focusing area of the distance measuring image chip. The optical lens can be formed by coupling a plurality of lenses. The distance measuring image chip is typically a CCD (charge-coupled device) chip in a 3-D (three-dimensional imaging type) camera capable of measuring distance relative to the object. Therefore, a 3-D camera may be employed as a photographing mechanism.

The processing mechanism is adapted to derive information about the object from the focused image on the distance measuring image chip of the photographing mechanism. The processing mechanism has an image processing function of controlling the camera to obtain good quality images and for controlling the image processing for processing the taken images for analysis and a storing function of storing (recording) an operation control software, data for correction, buffer frame memory for preprocessing, defined data for recognition computing, reference patterns.

In an embodiment, the aforementioned control mechanism is adapted to control to change the light emitting mode of the light emitting mechanism based on information about the quantity of incident light derived by the processing mechanism such that the quantity of incident light (sometimes called "quantity of reflected light") on the distance measuring image chip is equalized to the respective portions of the focusing area. The light emitting mode includes quantity of emitting light, time of turning on light, time of turning off light, and time and speed of blinking, and the like.

In the case of using the photographing mechanism as mentioned above to detect information about the object, it is known that the accuracy of detection of the vehicle occupant is deteriorated because of the following reasons. That is, the quantity of light focused into a focusing area of the distance measuring image chip through the optical lens is decreased at the peripheral area. This phenomenon becomes significant as the viewing angle of the camera is increased. In addition, the distortion of an image focused in the focusing area of the image chip is increased at the peripheral area as compared to the central area, thus deteriorating the accuracy of detection of the vehicle occupant. Particularly in the case of using a 3-D camera to detect information about distances relative to an object for the purpose of obtaining detailed information such as the position, posture, size, and motion of the object, there must be deterioration and variation in accuracy of detected distances relative to the object so that it may be difficult to obtain desired information.

In exemplary embodiments, the light emitting mode of the light emitting mechanism is controlled to be changed based on information about the quantity of incident light. According to this arrangement, the quantity of incident light on the distance measuring image chip is equalized to respective portions of the focusing area. The equalization of the quantity of incident light used here can be a state that the quantity of light incident on the distance measuring image chip is in a predetermined suitable range at each of the respective portions of the focusing area. The only requirement is that the incident light quantities at the respective portions of the focusing area are substantially equal.

As mentioned above, there may be specific issues with optical lens such that the quantity of light focused into the focusing area of the distance measuring image chip through the optical lens is reduced at the peripheral portion and the accuracy of detection of the object is reduced depending on the position. The issues become significant as the viewing angle of the camera is increased. According to the structure of the object detecting system of a first embodiment the light emitting mode of the illumination mechanism can be controlled as appropriate. Therefore, it is possible to precisely detect information about the object occupying the vehicle seat by using the photographing mechanism.

Information about the object detected by the object detecting system is suitably used for controlling an occupant restraining mechanism for restraining a vehicle occupant, such as an airbag device, a seat belt device, and a warning device for outputting warning signals (display, sound and so on).

In the object detecting system of a second embodiment, the control mechanism controls to change the light emitting mode of the light emitting mechanism such that the quantity of incident light on a peripheral portion of an aperture area of an objective lens among respective portions of the optical lens becomes larger than the quantity of incident light on a central portion of the aperture area of the objective lens. In embodiments, the aperture area of the objective lens may be defined as an area, on which light is incident, of a lens (objective lens) which is nearest to the object to be detected among a plurality of lenses composing the optical lens. Accordingly, the quantity of light focused on the distance measuring image chip through the peripheral portion of the aperture area of the objective lens is increased, thereby improving the accuracy of detection of the object to be detected by the portion corresponding to the peripheral portion of the focusing area.

As mentioned above, there may be specific issues with optical lens such that the quantity of light focused into the focusing area of the distance measuring image chip through the optical lens is reduced at the peripheral portion and the distortion of image focused into the focusing area of the distance measuring image chip is increased at the peripheral portion as compared to the central portion. The problems become significant as the viewing angle of the camera is increased. According to the structure of the object detecting system of the embodiment, the light emitting mode of the illumination mechanism can be controlled as appropriate.

In the object detecting system of a third embodiment, the processing mechanism is adapted to derive information about distances as the information about the object a plurality of times. In addition, the control mechanism controls to change the light emitting quantity of the light emitting mechanism corresponding to the object when there is certain fluctuation in information of distances derived by the processing mechanism a plurality of times. The certain fluctuation may be evaluated according to whether a standard deviation or a difference between the maximum and the minimum as used in conventional calculating manners is in a predefined range. This control is based on such a consideration that certain fluctuation is caused by inaccurate light emitting mode of the illuminants so that it is required to make the light emitting mode accurate when there is certain fluctuation.

Therefore, according to the structure of the object detecting system of the third embodiment, such fluctuation in information about distances relative to the object can be prevented by making the light emitting mode of the illuminants accurate, thereby obtaining further precisely detected information.

In the object detecting system of a fourth embodiment, the processing mechanism is adapted to derive information about position, information about distances, and information about motion as the information about the object. In addition, the control mechanism controls to change the light emitting mode of the light emitting mechanism based on at least one of the information about position, the information about distances, and the information about motion derived by the processing mechanism.

Therefore, according to the structure of the object detecting system of the fourth embodiment, the accuracy of calculation of the light quantity and the light emitting pattern of the light emitting mechanism can be improved by controlling the light emitting mode of the light emitting mechanism to be changed based on the information about position, the information about distance, and/or the information about motion of the object.

In the object detecting system of a fifth embodiment, the control mechanism carries out the control of changing the light emitting mode of the light emitting mechanism in a manner that makes the change of the light emitting mode hardly noticed by the vehicle occupant. The embodiment includes a control for adjusting the time and/or speed of changing the light emitting mode to make the change of the light emitting mode hardly noticed by the vehicle occupant. Specifically, the change of the light emitting quantity or the light emitting pattern is conducted instantaneously within an extremely short time or is conducted gradually over time, thereby enabling the control making the change hardly noticed by the vehicle occupant.

Therefore, according to the structure of the object detecting system of the fifth embodiment, the light emitting quantity or the light emitting pattern can be changed without making the vehicle occupant feel uncomfortable due to flicker.

The operation device control system of a sixth embodiment comprises an object detecting system, an operation device which is operated based on the information about the object occupying the vehicle seat derived by the processing mechanism of the object detecting system, and an actuation control mechanism for controlling the actuation of the operation device. The operation device includes a warning device for outputting warning signals and an occupant restraining device for restraining a vehicle occupant by an airbag and/or a seat belt.

Therefore, according to the structure of the operation device control system of the sixth embodiment, the operation device can be controlled to be actuated in a suitable mode according to detection results about the object derived by the processing mechanism of the object detecting system, thereby enabling detailed control for the operation device.

The vehicle of a seventh embodiment comprises an engine/running system, an electrical system, an actuation control device, and an object detecting mechanism. The engine/running system is a system involving an engine and a running mechanism of the vehicle. The electrical system is a system involving electrical parts used in the vehicle. The actuation control device is a device having a function of conducting the actuation control of the engine/running system and the electrical system. The object detecting mechanism is a mechanism for detecting information about an object occupying a vehicle seat.

According to this arrangement, there is provided a vehicle mounted with an object detecting system in which information about an object occupying a vehicle seat can be precisely detected by a photographing mechanism.

As described in the above, embodiments relate to a structure for detecting information about an object occupying a vehicle seat by a photographing mechanism comprising an optical lens and a distance measuring image chip and a light emitting mechanism. Based on derived information about quantity of incident light, the light emitting mode of the light emitting mechanism is controlled to be changed such that the quantity of light incident on the distance measuring image chip is equalized at respective portions of the focusing area, thereby precisely detecting information about the object occupying the vehicle seat.

Hereinafter, description will be made with regard to an embodiment of an object detecting system 100 (object detecting mechanism) with reference to FIG. 1 through FIG. 7.

The structure of the object detecting system 100, which is installed in a vehicle, of this embodiment is shown in FIG. 1.

The object detecting system 100 of this embodiment is constructed as a system for detecting information about an object such as a vehicle occupant in a vehicle compartment of an automobile. As shown in FIG. 1, the object detecting system 100 comprises a photographing device 110, an illumination device 130, and a control/computing unit 150.

Figure 8:
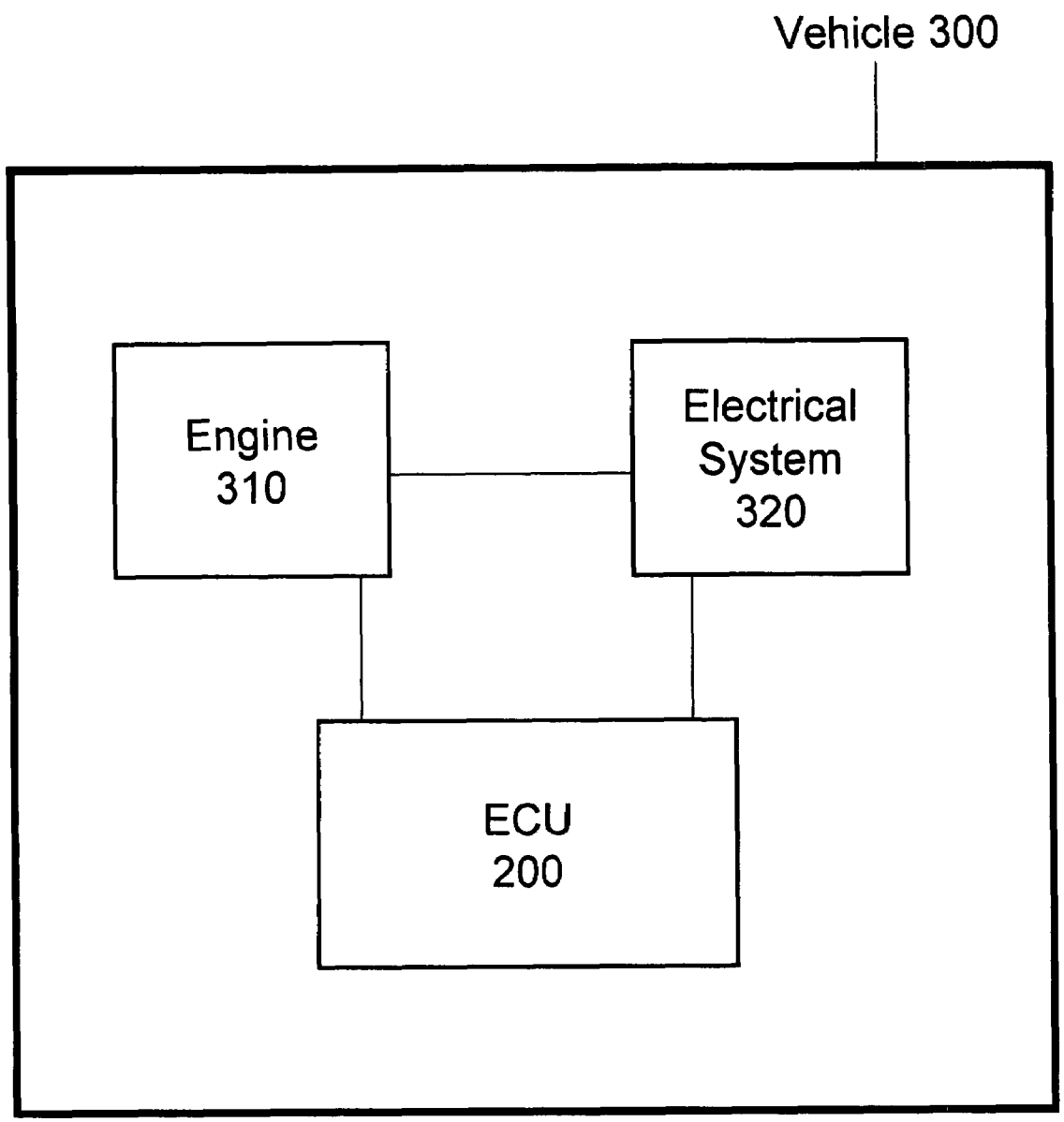
FIG. 8 is an illustration showing components of a vehicle according to an embodiment.

Further, the object detecting system 100 cooperates with an ECU 200 as an actuation control device of the vehicle and an occupant restraining mechanism 210 to compose an occupant restraining apparatus for restraining a vehicle occupant in the event of a vehicle collision. The automobile 300 comprises (as shown in FIG. 8) an engine/running system 310 involving an engine and a running mechanism of the vehicle, an electrical system 320 involving electrical parts used in the vehicle, and the actuation control device (ECU 200) for conducting the actuation control of the engine/running system and the electrical system.

The photographing device 110 of this embodiment includes a camera 112 as a photographic device and a data transmitting circuit (not shown). The camera 112 is a 3-D (three-dimensional) camera (sometimes called "monitor") of a CCD (charge-coupled device) type in which light sensors are arranged into an array (lattice) arrangement. The camera 112 comprises an optical lens 114 and a distance measuring image chip 116. The optical lens 114 is formed by coupling a plurality of lenses and the distance measuring image chip 116 is a CCD (charge-coupled device) chip in a 3-D camera. In the camera 112, light which is incident on the distance measuring image chip 116 through the optical lens 114 is focused into a focusing region of the distance measuring image chip 116. Information about distances relative to the object is measured by the camera 112 having the aforementioned structure a plurality of times, thereby detecting three-dimensional surface profile which is used for recognition of the presence, size, position, and posture of the object. Information about quantity or brightness of light which is incident on the distance measuring image chip 116 through the optical lens 114 is also detected by the camera 112. As the camera 112, a monocular C-MOS 3-D camera or a pantoscopic stereo 3-D camera may be used.

Figure 1B:
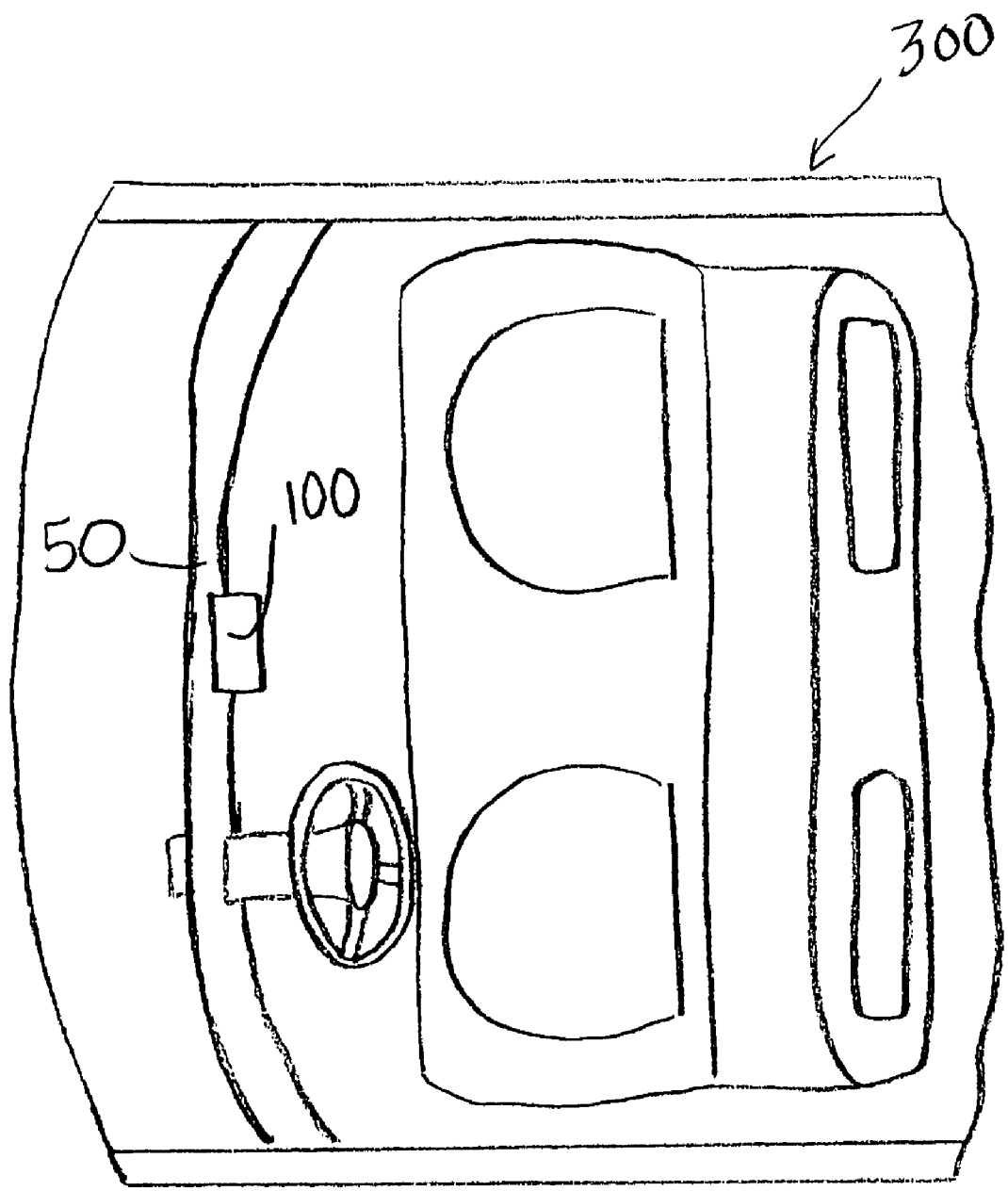

The camera 112 of this embodiment is placed and embedded in a peripheral portion of an inner rear view mirror, peripheral portions of side mirrors, the ceiling, and/or a center portion in the lateral direction of a dashboard and is arranged to face one or a plurality of passenger seats. By using the camera 112, information about the object occupying a vehicle seat such as a driver seat, a front passenger seat, or a rear passenger seat is measured a plurality of times periodically. The object detecting system 100 of the embodiment is provided with a power source for supplying electric power of a vehicular battery to the camera 112, but not shown. The camera 112 is set to be actuated, for example, when an ignition key is turned on or when a seat sensor (not shown) installed in the driver seat detects a vehicle occupant seated in the driver seat. In FIG. 1(b), an exemplary embodiment is shown in which the object detecting system 100 is embedded in a portion of a dashboard 50 in the vehicle 300.

The illumination device 130 of this embodiment comprises at least a first illuminant 131 and a second illuminant 132, a first driving section 133 and a second driving section 134. The first illuminant 131 is driven by the first driving section 133 and the second illuminant 132 is driven by the second driving section 134. Light emitted from the first illuminant 131 and the second illuminant 132 and reflected by the object C is distributed to the camera 112. The first driving section 133 and the second driving section 134 drive the respective illuminants according to control signals from the control/computing unit 150. The first driving section 133 and the second driving section 134 may be structured as a single driving section. The light emitting mechanism of an embodiment includes the first illuminant 131 and the second illuminant 132. The control mechanism of an embodiment includes the first driving section 133, the second driving section 134, and the control/computing unit 150 cooperate together to compose.

The control/computing unit 150 of this embodiment comprises at least an image processing mechanism 152, a computing mechanism (MPU: micro processing unit) 154, a storing mechanism 156, an input/output mechanism 158, and a peripheral device (not shown). The control/computing unit 150 is a mechanism for deriving information about the object occupying the vehicle seat based on images obtained by the camera 112. The processing mechanism of an embodiment includes the control/computing unit 150.

The image processing mechanism 152 is a mechanism for controlling the camera to obtain good quality images and for controlling the image processing for processing images taken by the camera 112 to be used for analysis. Specifically, as for the control of the camera, the frame rate, the shutter speed, the sensitivity setting, and the accuracy are corrected and the dynamic range, the brightness, and the white balance are adjusted. As for the control of the image processing, the spin compensation for image, the correction for distortion of the lens, the filtering operation, the difference operation as image preprocessing operations are conducted and the configuration determination and the trucking as image recognition processing operations are conducted.

The computing mechanism 154 carries out a process of extracting information about the object based on the information from the image processing mechanism 152. Specifically, information about the presence, size, position, and posture of the object are extracted (derived). When the object is a vehicle occupant, the presence of a vehicle occupant, the size (physique class) of the vehicle occupant, positions of the occupant's head, shoulder, and upper body, and whether the occupant is out-of-position (OOP) are extracted (derived).

The storage mechanism 156 is a mechanism for storing (recording) data for correction, buffer frame memory for preprocessing, defined data for recognition computing, reference patterns, and the computed results of the computing mechanism 154 a well as an operation control software.

The input/output mechanism 158 inputs information about the vehicle, information about traffic conditions around the vehicle, information about weather condition and about time zone, and the like to the ECU 200 for conducting controls of the entire vehicle and outputs recognition results. As the information about the vehicle, there are, for example, the state (open or closed) of a vehicle door, the wearing state of the seat belt, the operation of brakes, the vehicle speed, and the steering angle. In this embodiment, based on the information outputted from the input/output mechanism 158, the ECU 200 outputs actuation control signals to the occupant restraining mechanism 210 as a subject to be actuated. The occupant restraining mechanism 210 may be an apparatus for restraining an occupant such as an airbag and a seat belt. The operation device of an embodiment includes the occupant restraining mechanism 210. The actuation control mechanism of an embodiment includes the ECU 200 for controlling the actuation of the occupant restraining mechanism 210. In addition to the occupant restraining mechanism 210 or instead of the occupant restraining mechanism 210, the actuation of a warning device for outputting warning signals (display, sound and so on) may be controlled by the ECU 200.

The illumination device 130 having the aforementioned structure will be described in detail with reference to FIG. 2. FIG. 2 shows detailed structures of the first illuminant 131 and the second illuminant 132 shown in FIG. 1.

As shown in FIG. 2, the illumination device 130 of this embodiment has a structure in which a large number of light emitting lamps are arranged on a facing surface 130a facing the object. Among the light emitting lamps, a plurality of light emitting lamps arranged in a central area 131a of the facing surface 130a compose the first illuminant 131 and a plurality of light emitting lamps arranged in a peripheral area 132a around the central area 131a compose the second illuminant 132. Light emitted from the first illuminant 131 and reflected by an object C is incident on a central area of the distance measuring image chip 116 through a central portion of the aperture area of an objective lens of the optical lens 114 in the camera 112, while light emitted from the second illuminant 132 and reflected by the object C is incident on a peripheral area of the distance measuring image chip 116 (a portion around the central area of the distance measuring image chip 116) through a peripheral portion of the aperture area of the objective lens (a portion around the central portion of the aperture area of the objective lens) of the optical lens 114 in the camera 112. The aperture area of the objective lens is an area allowing incident of light in a lens (objective lens), disposed nearest to the object to be detected, among the plurality of lenses composing the optical lens 114.

In the case of using the camera 112 as used in this embodiment, the quantity of light focused into a focusing area of the distance measuring image chip 116 through the optical lens 114 is decreased at the peripheral area. This phenomenon becomes significant as the viewing angle of the camera is increased. In addition, the distortion of an image focused in the focusing area of the distance measuring image chip 116 is increased at the peripheral area as compared to the central area, thus deteriorating the accuracy of detection of the object. Particularly in the case of using a 3-D camera to detect information about distances relative to a vehicle occupant for the purpose of obtaining detailed information such as the position, posture, and physical size of the vehicle occupant, there must be deterioration and variation in accuracy of detected distances relative to the vehicle occupant so that it is difficult to obtain desired information.

In this embodiment, the plurality of light emitting lamps are sectioned (divided) into two blocks, i.e. the first illuminant 131 and the second illuminant 132, in such a manner that the quantity of incident light (sometimes called "quantity of reflected light") onto the distance measuring image chip 116 is equalized to respective portions in the focusing area and that the first illuminant 131 is made as an illuminant having a relatively small quantity of light (relatively dark illuminant), while the second illuminant 132 is made as an illuminant having a relatively large quantity of light (relatively bright illuminant). Accordingly, the quantity of light of the first illuminant 131 emitting light to be incident on the central portion of the aperture area of the objective lens 114 is restrained relative to the quantity of light of the second illuminant 132 emitting light to be incident on the peripheral portion of the aperture area of the objective lens 114. Specifically, first the quantity of light incident on the distance measuring image chip 116 is detected. The first illuminant 131 and the second illuminant 132 are controlled in such a manner that the quantity of light incident on the central area of the distance measuring image chip 116 and the quantity of light incident on the peripheral area of the distance measuring image chip 116 are substantially the same. It should be noted that, as mentioned above, the light emitted from the first illuminant 131 is reflected by the object C, and is then incident on the central area of the distance measuring image chip 116 through the optical lens 114, while light emitted from the second illuminant 132 is reflected by the object C, and is then incident on the peripheral area of the distance measuring image chip 116 through the optical lens 114.

According to the structure as mentioned above, it is possible to equalize the quantity of incident light onto the distance measuring image chip 116 relative to the respective portions of the focusing area, thereby improving the detection accuracy of the object detected through the camera 112 in a wider area. That is, according to this embodiment, the issue that the distance from a detection surface to a peripheral portion is longer than the distance from the detection surface to a central portion as seen in the distance distribution and the quantity of light focused into the focusing area of the distance measuring image chip through the lens is reduced at the peripheral portion as compared to the central portion can be solved by the control of the illumination device 130 (the first illuminant 131 and the second illuminant 132). The improvement of the detection accuracy according to the control allows use of the image chip having low dynamic range, thereby reducing the cost of the system. Since the quantity of light (heat value) of the light emitting lamps arranged in the central area of the illumination device 130 is set to be lower than that of the peripheral area, the radiation effect of the entire illuminant can be improved and the durability of the illuminant can be improved simultaneously.

Specific controls in the first illuminant 131 and the second illuminant 132 of the illumination device 130 will be further described with reference to FIG. 3 through FIG. 5. The controls are carried out by the first driving section 133, the second driving section, and the control/computing unit 150 shown in FIG. 1. FIG. 3 shows a flow chart of an object detection process control in this embodiment, FIG. 4 shows a flow chart of a light quantity adjusting process in this embodiment, and FIG. 5 shows a flow chart of a measured distance fluctuation adjusting process in this embodiment.

In the object detection process control shown in FIG. 3, the light quantity adjusting process as step S10, the measured distance fluctuation adjusting process as step S20, and object discriminating process as step S20 are sequentially carried out. It should be noted that the light quantity adjusting process in step S10 and the measured distance fluctuation adjusting process in step S20 may be carried out in parallel and, after that, the object discriminating process in step S30 may be carried out.

In the light quantity adjusting process of this embodiment, the light emitting mode of the first illuminant 131 and the second illuminant 132 are adjusted. The light emitting mode includes quantity of emitting light, time of turning on light, time of turning off light, time and speed of blinking, and the like.

First, light quantity data is obtained in step S11 shown in FIG. 4. The light quantity data is obtained through the camera 112. Then, in step S12, it is determined whether or not the light quantity from the illuminants is in a predetermined range of specified values (a predetermined region) based on the light quantity data obtained in step S11. Specifically, a reference range of light quantity in which light quantity is effective for detecting an object precisely is previously set. When the light quantity actually detected is in the reference range, it is determined that the light quantity from the illuminants is in the predetermined range of specified values. When the light quantity actually detected is outside the reference range, it is determined that the light quantity from the illuminants is outside the preset range of specified values. When it is determined that the light quantity is not in the predetermined range of specified values (No in step S12), the process proceeds to step S13. When it is determined that the light quantity is in the predetermined range of specified values (Yes in step S12), the light quantity adjusting process is terminated.

In step S13 shown in FIG. 4, it is determined whether or not the light emitting pattern of the illuminants is needed to be changed. When the light emitting pattern of the illuminants is needed to be changed (Yes in step S13), the process proceeds to step S14. When the light emitting pattern of the illuminants is not needed to be changed (No in step S13), the process proceeds to step S17. In step S14, it is determined whether or not the light emitting pattern of the illuminants is fast. Specifically, when the speed is higher than a predetermined range of reference speed values, it is determined that the light emitting pattern is fast. When the speed is lower than the predetermined range of reference speed values, it is determined that the light emitting pattern is slow. When it is determined that the light emitting pattern is fast (Yes in step S14), the speed of the light emitting pattern is reduced to, for example, a lower predetermined reference value in step S15. On the other hand, when it is determined that the light emitting pattern is slow (No in step S14), the speed of the light emitting pattern is increased to, for example, a upper predetermined reference value in step S16. After step S15 or step S16, the process is returned to step S11.

In changing the speed of the light emitting pattern in step S15 or step S16 shown in FIG. 4, it is preferable to control to make the change hardly noticed by the vehicle occupant, i.e. not to cause a perceptible flicker. Specifically, the change of the light emitting quantity or the light emitting pattern is conducted instantaneously within an extremely short time or is conducted gradually over time, thereby enabling the control to hardly make the vehicle occupant notice the change. Therefore, the light emitting quantity or the light emitting pattern can be changed without making the vehicle occupant feel uncomfortable due to flicker.

In step S17 shown in FIG. 4, it is determined whether or not the light quantity from the illuminants is higher than the predetermined range of specified values. When it is determined that the light quantity from the illuminants is higher than the predetermined range of specified values (Yes in step S17), the light quantity is lowered to, for example, a predetermined lower specified value in step S18. On the other hand, when it is determined that the light quantity from the illuminants is lower than the predetermined range of specified values (No in step S17), the light quantity is raised to, for example, a predetermined upper specified value in step S19. Accordingly, the light quantity from the illuminants is optimized. After step S18 or step S19, the process is returned to step S11.

By carrying out the light quantity adjusting process of this embodiment shown in FIG. 4, the light quantity from the illuminants is controlled to be into the predetermined range of specified values (predetermined region). At this point, the specified values for the first illuminant 131 and the specified values for the second illuminant 132 are set to correspond to each other, whereby the quantity of incident light onto the distance measuring image chip 116 of the camera 112 is equalized to the respective portions of the focusing area. Therefore, the light quantity from the illuminants is controlled in such a manner that the quantity of light incident on the central area of the distance measuring image chip 116 and the quantity of light incident on the peripheral area of the distance measuring image chip 116 are substantially the same. It should be noted that, as mentioned above, the light emitted from the first illuminant 131 is reflected by the object C, and is then incident on the central area of the distance measuring image chip 116 through the optical lens 114, while light emitted from the second illuminant 132 is reflected by the object C, and is then incident on the peripheral area of the distance measuring image chip 116 through the optical lens 114.

This light adjusting process of this embodiment controls to change the light emitting mode of the light emitting mechanism based on information about the quantity of incident light derived by the processing mechanism such that the quantity of incident light on the distance measuring image chip is equalized to respective portions of the focusing area and controls to change the light emitting mode of the light emitting mechanism such that the quantity of incident light on a peripheral portion of an aperture area of an objective lens among respective portions of the optical lens becomes larger than the quantity of incident light on a central portion of the aperture area of the objective lens.

In the measured distance fluctuation adjusting process of this embodiment, the light quantities of the first illuminant 131 and the second illuminant 132 are adjusted based on the result of measurement of distances relative to the object by the camera 112. That is, the measured distance fluctuation adjusting process is based on such a consideration that fluctuation in results of a plurality of times of distance measurements is caused by inaccurate light quantity from the illuminants and inaccurate light emitting pattern so that it is required to make the light quantity and the light emitting pattern accurate when there is fluctuation in measured distances.

In step S21 shown in FIG. 5, a range for calculating fluctuation in measured distances is obtained. Specifically, among the portions of the focusing area of the distance measuring image chip 116 of the camera 112, a range (calculating range) including portions as a subject for calculating fluctuation in measure distances is defined. The range of the distance measuring image chip 116 may be previously set or a range including portions detecting previously set distances may be selected.

Then, in step S22 shown in FIG. 5, measured distance data corresponding to the calculating range obtained in step S21 are obtained a plurality of times. After that, in step S23, fluctuation in measured distance data is calculated. The fluctuation is evaluated according to standard deviation or a difference between the maximum and the minimum as used in conventional calculating manners.

In step S24 shown in FIG. 5, it is determined whether or not the calculated value of the fluctuation calculated in step S23 is lower than a predetermined value. When the calculated value is lower than the predetermined value (Yes in step S24), it is determined that the calculation fluctuation is smaller than the desired fluctuation and the measured distance fluctuation adjusting process is then terminated. On the other hand, when the calculated value is higher than the predetermined value (No in step S24), it is determined that the calculation fluctuation is larger than the desired fluctuation and the process proceeds to the light quantity adjusting process in step S26.

In the light quantity adjusting process in step S26, the light quantity from the illuminants and the light emitting pattern are adjusted in order to improve the detection accuracy at the portions having larger fluctuation in measured distances. For example, the light quantity from the illuminants corresponding to the portions having larger fluctuation in measured distances is controlled to be increased. This controls to change the light,emitting quantity of the light emitting mechanism corresponding to the object when there is certain fluctuation in information of distances derived by the processing mechanism a plurality of times.

By performing the measured distance fluctuation adjusting process of this embodiment shown in FIG. 5, fluctuation in measured distances are controlled to be smaller than the predetermined value.

In the object discriminating process of the embodiment, information about the object occupying the vehicle seat such as the presence, size, position, distance, posture, and motion of the object are derived based on the information detected by the camera 112. When the object is a vehicle occupant, the presence of a vehicle occupant, size (physique class), position, distances, posture, motion of the vehicle occupant, and whether the vehicle occupant is an adult or a child are derived.

In this embodiment, the light quantity and the light emitting pattern can be controlled based on the information about the position, distances, and motion of the vehicle occupant obtained by the object discriminating process shown in FIG. 3. FIG. 6 shows a flow chart of a position-based light quantity adjusting process of this embodiment and FIG. 7 shows a flow chart of a motion-based light quantity adjusting process of this embodiment.

In the position-based light quantity adjusting process shown in FIG. 6, information about position of the object and information about distances relative to the object obtained by the object discriminating process shown in FIG. 3 are acquired in step S40. Then, in step S42, adequate light quantity is calculated based on the information about position of the object and the information about distances relative to the object obtained in step S40. In step S44, the light quantity is controlled to be adjusted to the adequate light quantity. According to this control, the combination of the information about position of the object and the information about distances relative to the object improves the accuracy of calculation of the light quantity and the light emitting pattern and achieving high-speed process.

In the motion-based light quantity adjusting process shown in FIG. 7, information about motion of the object and information about distances relative to the object obtained by the object discriminating process shown in FIG. 3 are acquired in step S50. Then, in step S52, adequate light quantity is calculated based on the information about motion of the object and the information about distances relative to the object obtained in step S50. In step S54, the light quantity is controlled to be adjusted to the adequate light quantity. Specifically, when the motion of the object is fast, information about distances are obtained at a higher frame rate, thereby enabling more accurate information detection. In this case, the light quantity is adjusted to have lighter illuminants and stronger irradiation. According to this control, combination of the information about motion of the object and the information about distances relative to the object improves the accuracy of calculation of the light quantity and the light emitting pattern and achieving high-speed process.

According to an embodiment, the control to the "controls to change the light emitting quantity of the light emitting mechanism based on at least one of the information about position, the information about distances, and the information about motion derived by the processing mechanism is shown in FIG. 6 or FIG. 7. It should be noted that, instead of the control as shown in FIG. 6 or FIG. 7, a control for adjusting the light emitting mode based on any one of information about position, information about distances, and information about motion may be conducted.

Information detected by the object detecting system 100 having the aforementioned structure is transmitted to the ECU 200 shown in FIG. 1 continuously or at regular time intervals so that the ECU 200 control the actuation of the occupant restraining mechanism 210. For example, the restraining performance (occupant restraining mode) by the occupant restraining mechanism 210 such as an airbag device and a seat belt device is altered according to the presence, physical size, position, distance, motion, and posture of a vehicle occupant. Specifically, the restraining performance (occupant restraining mode) can be controlled to be altered by changing the energy absorbing capacity of the airbag and/or the seat belt and/or changing the deployment speed of the airbag.

According to this embodiment, a control of actuating the occupant restraining mechanism 210 only when there is a vehicle occupant on the vehicle seat is enabled by detecting the presence of the vehicle occupant on the vehicle seat. Therefore, undesired actuation of the occupant restraining mechanism 210 can be prevented. When the presence of vehicle occupants on front seats and rear seats are detected, a control of urging the occupant(s) not wearing a seat belt to wear the seat belt by the warning device which outputs warning signals (display, sound and so on) may also be conducted.

There are issues specific to optical lens such that the quantity of light focused into the focusing area of the distance measuring image chip 116 through the optical lens 114 is reduced at the peripheral portion and the distortion of image focused into the focusing area of the distance measuring image chip 116 is increased at the peripheral portion as compared to the central portion. This can become significant as the viewing angle of the camera is increased. However, by using the object detecting system 100 of this embodiment as mentioned above, the light emitting mode of the illumination device 130 (the first illuminant 131 and the second illuminant 132) can be controlled. Therefore, information about the object occupying the vehicle seat can be detected precisely by using the photographing device 110. The improvement of the detection accuracy by controlling the light emitting mode of the illumination device 130 (the first illuminant 131 and the second illuminant 132) allows use of the image chip having low dynamic range, thereby reducing the cost of the system. Since the quantity of light (heat value) of the light emitting lamps arranged in the central area of the illumination device 130 is set to be lower than that of the peripheral area, the radiation effect of the entire illuminant can be improved and the durability of the illuminants can be improved simultaneously. In addition, the control of turning off and turning on the illuminants as appropriate can improve the durability of the illuminants.

According to this embodiment, the measured distance fluctuation adjusting process shown in FIG. 5 is carried out so as to obtain adequate adjustment of light emitting mode of the illumination device 130 (the first illuminant 131 and the second illuminant 132), thereby reducing fluctuation in information about distances relative to the objects and thus obtaining information with more accurate detection.

According to this embodiment, the position-based light quantity adjusting process shown in FIG. 6 or the motion-based light quantity adjusting process shown in FIG. 7 is carried out so that the light emitting mode of the illumination device 130 (the first illuminant 131 and the second illuminant 132) is controlled to be changed based on the information about position, distances, and/or motion of the object, thereby improving the calculation accuracy of the light quantity and the light emitting pattern.

According to this embodiment, a control of adjusting the time and/or the speed of changing the light emitting mode is carried out not to make the vehicle occupant notice the change in the light emitting mode of the illumination device 130 (the first illuminant 131 and the second illuminant 132), whereby the light emitting quantity or the light emitting pattern can be changed without making the vehicle occupant feel uncomfortable due to flicker.

By using the object detecting system 100 of this embodiment, the occupant restraining mechanism 210 can be controlled to be actuated in a suitable mode according to detection results of the object detecting system, thereby enabling detailed control for the occupant restraining mechanism 210.

According to this embodiment, there is provided a vehicle mounted with the object detecting system 100 capable of precisely detecting information about the object occupying the vehicle seat by using the photographing device 110.

The present invention is not limited to the aforementioned embodiments and various applications and modifications may be made. For example, the following respective embodiments based on the aforementioned embodiment may be carried out.

Though the object detecting system 100 capable of carrying out all of the processes shown in FIG. 4 through FIG. 7 has been described in the aforementioned embodiment, embodiments may employ an object detecting system capable of carrying out at least one of the processes shown in FIG. 4 through FIG. 7.

In embodiments, the object to be detected through the camera 112 includes a vehicle occupant, an object placed on a vehicle seat, a child seat, and a junior seat. In this case, information about the object includes information about presence, size, position, distances, posture, motion of the object, and light emitting quantity (light distribution amount) and brightness relative to the object.

Though the aforementioned embodiment has been described with regard to the arrangement of the object detecting system to be installed in an automobile, embodiments can be adopted to object detecting systems to be installed in various vehicles other than automobile such as an airplane, a boat, a train, a bus, a truck, and the like.

The Japanese Priority Application 2006-036746, filed Feb. 14, 2006, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An object detecting system comprising:
    a light emitting mechanism to emit light toward an object occupying a vehicle seat;
    a control mechanism to control the light emitting mechanism;
    a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and
    a processing mechanism to derive information about the object from the focused image on the distance measuring image chip of the photographing mechanism;
    wherein the control mechanism changes a light emitting mode of the light emitting mechanism based on information about a quantity of incident light derived by the processing mechanism such that a quantity of incident light on the distance measuring image chip is equalized to respective portions of the focusing area.

2. The object detecting system as claimed in claim 1, wherein the control mechanism is configured to change the light emitting mode of the light emitting mechanism such that the quantity of incident light on a peripheral portion of an aperture area of an objective lens among respective portions of the optical lens becomes larger than the quantity of incident light on a central portion of the aperture area of the objective lens.

3. The object detecting system as claimed in claim 1, wherein the processing mechanism is adapted to derive information about distances as the information about the object a plurality of times, and
    the control mechanism is configured to change the light emitting quantity of the light emitting mechanism corresponding to the object when there is certain fluctuation in information of distances derived by the processing mechanism a plurality of times.

4. The object detecting system as claimed in claim 1, wherein the processing mechanism is adapted to derive information about position, information about distances, and information about motion as the information about the object, and
    wherein the control mechanism is configured to change the light emitting mode of the light emitting mechanism based on at least one of the information about position, the information about distances, and the information about motion derived by the processing mechanism.

5. The object detecting system as claimed in claim 1, wherein the control mechanism changes the light emitting mode of the light emitting mechanism in a manner that makes the change of the light emitting mode hardly noticed by the vehicle occupant.

6. An operation device control system comprising:
    a light emitting mechanism to emit light toward an object occupying a vehicle seat;
    a control mechanism to control the light emitting mechanism;
    a photographing mechanism including an optical lens and a distance measuring image chip, wherein light emitted from the light emitting mechanism and reflected by the object is incident on the distance measuring image chip through the optical lens and is focused into a focusing area of the distance measuring image chip;
    a processing mechanism to derive information about the object from the focused image on the distance measuring image chip of the photographing mechanism;
    an operation device which is operated based on the information about the object occupying the vehicle seat derived by the processing mechanism; and
    an actuation control mechanism to control the actuation of the operation device,
    wherein the control mechanism changes s light emitting mode of the light emitting mechanism based on information about a quantity of incident light derived by the processing mechanism such that a quantity of incident light on the distance measuring image chip is equalized to respective portions of the focusing area.

7. The operation device control system as claimed in claim 6, wherein the control mechanism is configured to change the light emitting mode of the light emitting mechanism such that the quantity of incident light on a peripheral portion of an aperture area of an objective lens among respective portions of the optical lens becomes larger than the quantity of incident light on a central portion of the aperture area of the objective lens.

8. The operation device control system as claimed in claim 6, wherein the processing mechanism is adapted to derive information about distances as the information about the object a plurality of times, and the control mechanism is configured to change the light emitting quantity of the light emitting mechanism corresponding to the object when there is certain fluctuation in information of distances derived by the processing mechanism a plurality of times.

9. The operation device control system as claimed in claim 6, wherein the processing mechanism is adapted to derive information about position, information about distances, and information about motion as the information about the object, and wherein the control mechanism is configured to change the light emitting mode of the light emitting mechanism based on at least one of the information about position, the information about distances, and the information about motion derived by the processing mechanism.

10. The operation device control system as claimed in claim 6, wherein the control mechanism changes the light emitting mode of the light emitting mechanism in a manner that makes the change of the light emitting mode hardly noticed by a vehicle occupant.

11. A vehicle comprising:

an engine;

an electrical system;

an actuation control device to control actuation of the engine and the electrical system; and an object detecting mechanism to detect information about an object occupying a vehicle seat, the object detecting mechanism comprising an object detecting system that includes:

a light emitting mechanism to emit light toward an object occupying a vehicle seat;

a control mechanism to control the light emitting mechanism;

a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and a processing mechanism to derive information about the object from the focused image on the distance measuring image chip of the photographing mechanism;

wherein the control mechanism changes a light emitting mode of the light emitting mechanism based on information about a quantity of incident light derived by the processing mechanism such that a quantity of incident light on the distance measuring image chip is equalized to respective portions of the focusing area.

12. The vehicle as claimed in claim 11, wherein the control mechanism is configured to change the light emitting mode of the light emitting mechanism such that the quantity of incident light on a peripheral portion of an aperture area of an objective lens among respective portions of the optical lens becomes larger than the quantity of incident light on a central portion of the aperture area of the objective lens.

13. The vehicle as claimed in claim 11, wherein the processing mechanism is adapted to derive information about distances as the information about the object a plurality of times, and the control mechanism is configured to change the light emitting quantity of the light emitting mechanism corresponding to the object when there is certain fluctuation in information of distances derived by the processing mechanism a plurality of times.

14. The vehicle as claimed in claim 11, wherein the processing mechanism is adapted to derive information about position, information about distances, and information about motion as the information about the object, and wherein the control mechanism is configured to change the light emitting mode of the light emitting mechanism based on at least one of the information about position, the information about distances, and the information about motion derived by the processing mechanism.

15. The vehicle as claimed in claim 11, wherein the control mechanism changes the light emitting mode of the light emitting mechanism in a manner that makes the change of the light emitting mode hardly noticed by a vehicle occupant.

* * * * *